(12) United States Patent
Cho et al.

(10) Patent No.: US 10,692,308 B2
(45) Date of Patent: Jun. 23, 2020

(54) TRANSFER SYSTEM FOR DIAGNOSING VEHICLE AND METHOD THEREOF

(71) Applicants: Kia Motors Corporation, Seoul (KR); Hyundai Motor Company, Seoul (KR)

(72) Inventors: Joonkwon Cho, Incheon (KR); Sangkyu Park, Gyeonggi-do (KR)

(73) Assignees: Kia Motors Corporation, Seoul (KR); Hyundai Motor Company, Seoul (KR)

( * ) Notice: Subject to any disclaimer, the term of this patent is extended or adjusted under 35 U.S.C. 154(b) by 80 days.

(21) Appl. No.: 15/831,917

(22) Filed: Dec. 5, 2017

(65) Prior Publication Data

US 2018/0197356 A1  Jul. 12, 2018

(30) Foreign Application Priority Data

Jan. 6, 2017  (KR) .................. 10-2017-0002353

(51) Int. Cl.
*G07C 5/08* (2006.01)
*G01M 17/007* (2006.01)
(Continued)

(52) U.S. Cl.
CPC .............. *G07C 5/0808* (2013.01); *B61J 1/12* (2013.01); *B65G 41/001* (2013.01); *B66F 9/14* (2013.01);
(Continued)

(58) Field of Classification Search
USPC ......................................... 701/29.1
See application file for complete search history.

(56) References Cited

U.S. PATENT DOCUMENTS 4,894,908 A * 1/1990 Haba, Jr. ............... B23P 21/004
29/711
6,324,749 B1 * 12/2001 Katsuura ............... B23P 21/004
29/402.01
(Continued)

FOREIGN PATENT DOCUMENTS

CN 106043366 A * 6/2016
CN 106240258 A * 12/2016
(Continued)

OTHER PUBLICATIONS

Google Translation of Chinese Pub. No. 206493798.*
(Continued)

*Primary Examiner* — Jean Paul Cass
(74) *Attorney, Agent, or Firm* — Mintz Levin Cohn Ferris Glovsky and Popeo, P.C.; Peter F. Corless

(57) ABSTRACT

A transfer system for diagnosing a vehicle is provided. The system includes a conveyor that moves the vehicle and a transfer unit that is disposed an input or an output side of the conveyor to move the vehicle into a diagnosing region for vehicle diagnosis. The transfer unit includes a guide rail disposed in both sides of the diagnosing region and a moving body disposed along the guide rail. Swing arms are rotatably connected with a forward and a rear side of the moving body and are concentrated inward to be disposed forward and rearward of a lower portion of a tire. Free rollers are rotatably disposed at each swing arm concentrated inward to clamp the tire. A swing arm driving unit provides a driving force so that the swing arms are concentrated inward or unfolded outward. A moving body moving unit moves the moving body along the guide rail.

13 Claims, 8 Drawing Sheets

(51) Int. Cl.
*B61J 1/12* (2006.01)
*B65G 41/00* (2006.01)
*B66F 9/14* (2006.01)
*B66F 11/00* (2006.01)

(52) U.S. Cl.
CPC .......... *B66F 11/00* (2013.01); *G01M 17/007* (2013.01); *G07C 2205/02* (2013.01)

(56) References Cited

U.S. PATENT DOCUMENTS

| | | | | |
|---|---|---|---|---|
| 6,831,996 | B1* | 12/2004 | Williams | G06K 9/3216 348/86 |
| 7,103,460 | B1* | 9/2006 | Breed | B60C 23/0408 701/29.1 |
| 2005/0166413 | A1* | 8/2005 | Crampton | B25J 13/088 33/503 |
| 2007/0005202 | A1* | 1/2007 | Breed | B60W 50/0205 701/29.1 |
| 2010/0256504 | A1* | 10/2010 | Moreau-Gaudry | A61B 5/0066 600/476 |
| 2013/0228093 | A1 | 9/2013 | Auer | |
| 2014/0197012 | A1* | 7/2014 | Miller | B65G 17/46 198/469.1 |
| 2014/0306390 | A1* | 10/2014 | Duncan | B60C 25/007 269/46 |
| 2015/0239669 | A1* | 8/2015 | Miller | B65G 15/28 209/583 |

FOREIGN PATENT DOCUMENTS

| | | | |
|---|---|---|---|
| CN | 206493798 U | * | 9/2017 |
| JP | 2003-119000 A | | 4/2003 |
| JP | 2014010546 A | * | 3/2014 |
| JP | 5771503 B2 | | 9/2015 |
| JP | 5812714 B2 | | 11/2015 |
| WO | WO 2009079929 A1 | * | 7/2009 |

OTHER PUBLICATIONS

Google Translation of WO 2009079929A1.*
Partial European Search Report for European Patent Application No. 17205418.1. dated May 7, 2018. 11 pages.
Extended European Search Report for European Patent Application No. 17205418, dated Aug. 16, 2018, 9 pages.

* cited by examiner

TRANSFER SYSTEM FOR DIAGNOSING VEHICLE AND METHOD THEREOF

CROSS-REFERENCE TO RELATED APPLICATION

This application claims priority to and the benefit of Korean Patent Application No. 10-2017-0002353 filed on Jan. 6, 2017, the entire contents of which are incorporated herein by reference.

BACKGROUND

(a) Field of the Invention

The present invention relates to a transfer system for diagnosing a vehicle, and more specifically, a transfer system capable of automatically entering and discharging a vehicle into and from a zone to diagnose a wheel alignment and a roll & brake during a manufacturing process.

(b) Description of the Related Art

When assembly of a vehicle is complete, the vehicle is moved along a conveyor, and the vehicle enters a diagnosing zone, the vehicle is moved to a preset position, a wheel alignment and a roll & brake are analyzed, and the vehicle is then moved again by the conveyor to repeat the operation. However, since a worker enters the vehicle into a diagnosing zone, settles or moves the vehicle, and discharges the vehicle, a cost is increased, overall productivity may be deteriorated, fatigue of the worker may be increased, and the product quality of the vehicle may be deteriorated due to initial assembly operation. Accordingly, research has been conducted regarding stable automation of entering a vehicle into a diagnosing zone, and settling the vehicle, and discharging the vehicle from the diagnosing zone when the diagnosing is completed.

The above information disclosed in this section is merely for enhancement of understanding of the background of the invention and therefore it may contain information that does not form the prior art that is already known in this country to a person of ordinary skill in the art.

SUMMARY

The present invention provides a transfer system for diagnosing a vehicle and a method thereof having advantages of improving a diagnosing efficiency of the vehicle and reducing a cost by automatically entering the vehicle into a wheel alignment diagnosing zone and a roll & brake diagnosing zone, and automatically moving the vehicle to the outside (e.g., out of an assembly line).

As described above, an exemplary embodiment of the present invention provides a transfer system for diagnosing a vehicle that may include a conveyor configured to move the vehicle; and a transfer unit disposed an input side or an output side of a conveyor to move the vehicle introduced into a diagnosing region to diagnose performance of the vehicle, wherein the transfer unit may include: a guide rail disposed in a moving direction of the vehicle in both sides of the diagnosing region; a moving body movably disposed along the guide rail; swing arms rotatably connected with a forward side and a rear side of the moving body, respectively, and concentrated inward to be disposed forward and rearward of a lower portion of a front wheel tire or a rear wheel tire of the vehicle; free rollers rotatably disposed at each side of the swing arm concentrated inward to rotatably clamp the tire, respectively; a swing arm driving unit configured to provide a driving force to either concentrate the swing arms inward or unfold the swing arms outward; and a moving body moving unit configured to move the moving body along the guide rail forward and rearward.

The transfer system may further include sensors disposed at a preset position to detect the vehicle introduced into the diagnosing region or discharged from the diagnosing region, respectively; and a controller configured to operate the swing arm driving unit and the moving body moving unit of the transfer unit based on the position of the vehicle detected by the sensors. The diagnosing region may include: a wheel alignment diagnosing region configured to diagnose alignment of the tire and the wheel of the vehicle; and a roll & brake diagnosing region disposed rearward of the wheel alignment diagnosing region to diagnose rotation and brake of the tire and the wheel.

The conveyor may include: a first conveyor disposed at an input side of the wheel alignment diagnosing region; second conveyors disposed at an output side of the wheel alignment diagnosing region and an input side of the roll & brake diagnosing region; and a third conveyor disposed at an output side of the roll & brake diagnosing region. The controller may be configured to operate the conveyor. In response to determining that the vehicle is introduced into the diagnosing region by the sensor, the controller may be configured to stop an operation of the conveyor disposed at the diagnosing region, move the moving body to a position that corresponds to the wheel of the vehicle when the swing arms are unfolded, concentrate the swing arms to cause the free rollers to clamp the tire, and the moving body driving unit may be configured to move the tire to a diagnosing position.

In response to determining that a performance of the vehicle is diagnosed, the controller may be configured to operate the moving body driving unit to move the tire to a preset position in an output direction, the swing arm driving unit may be configured to unfold the swing arm to separate the swing arms from the tire, and the controller may be configured to operate the conveyor disposed at an output side of the diagnosing region to discharge the vehicle from the diagnosing region. When the vehicle is introduced into the diagnosing region, the transfer unit may be configured to clamp and move a forward tire of the vehicle forward, and when the vehicle is discharged from the diagnosing region, the transfer unit may be configured to clamp the rear wheel of the vehicle to move the vehicle to the outside.

Another exemplary embodiment of the present invention provides a transfer method of diagnosing a vehicle that may include: introducing the vehicle to an input side of a diagnosing region using a conveyor; determining whether the vehicle is introduced into the diagnosing region; when the vehicle is introduced, moving the vehicle to a diagnosing position by clamping a forward wheel tire of the vehicle using a transfer unit; and diagnosing a performance of the vehicle, when the diagnosing is terminated, moving the vehicle to an output side of the diagnosing region by clamping the rear wheel tire of the vehicle by the transfer unit. The transfer method may further include: detecting a position of the vehicle using a sensor. The diagnosing region may include: a wheel alignment diagnosing region configured to diagnose alignment of the tire and the wheel of the vehicle; and a roll & brake diagnosing region disposed rearward of the wheel alignment diagnosing region to diagnose rotation and brake of the tire and the wheel.

The transfer unit may include: a guide rail disposed in a moving direction of the vehicle in both sides of the diagnosing region; a moving body movably disposed along the guide rail; swing arms rotatably connected with a forward side and a rear side of the moving body, respectively, and concentrated inward to be disposed forward and rearward of a lower portion of a front wheel tire or a rear wheel tire of the vehicle; free rollers rotatably disposed at each side of the swing arm concentrated inward to rotatably clamp the tire, respectively; a swing arm driving unit configured to provide a driving force to concentrate the swing arms inward or unfold the swing arms outward; and a moving body moving unit configured to move the moving body along the guide rail forward and rearward.

In response to determining that the vehicle is introduced into the diagnosing region by the sensor, the controller may be configured to stop an operation of the conveyor disposed at the diagnosing region, the controller may be configured to move the moving body to a position that corresponds to the wheel of the vehicle when the swing arms are unfolded, concentrate the swing arms to cause the free rollers to clamp the tire, and the moving body driving unit configured to move the tire to a diagnosing position.

In response to determining that a performance of the vehicle is diagnosed, the controller may be configured to operate the moving body driving unit to move the tire to a preset position in an output direction, the swing arm driving unit may be configured to unfold the swing arm to separate the swing arms from the tire, and the controller may be configured to operate the conveyor disposed at an output side of the diagnosing region to discharge the vehicle from the diagnosing region. When the vehicle is introduced into the diagnosing region, the transfer unit may be configured to clamp and move a forward tire of the vehicle forward, and when the vehicle is discharged from the diagnosing region, the transfer unit may be configured to clamp the rear wheel of the vehicle to move the vehicle to the outside (e.g., outside the assembly line).

According to the present invention to accomplish the above objective, the vehicle may automatically enter into a vehicle diagnosing zone such as a wheel alignment diagnosing zone and a roll & brake diagnosing zone using the transfer unit, and may be automatically discharged therefrom after the diagnosing is terminated to improve productivity and reduce the cost.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

DESCRIPTION OF SYMBOLS

Figure 1:
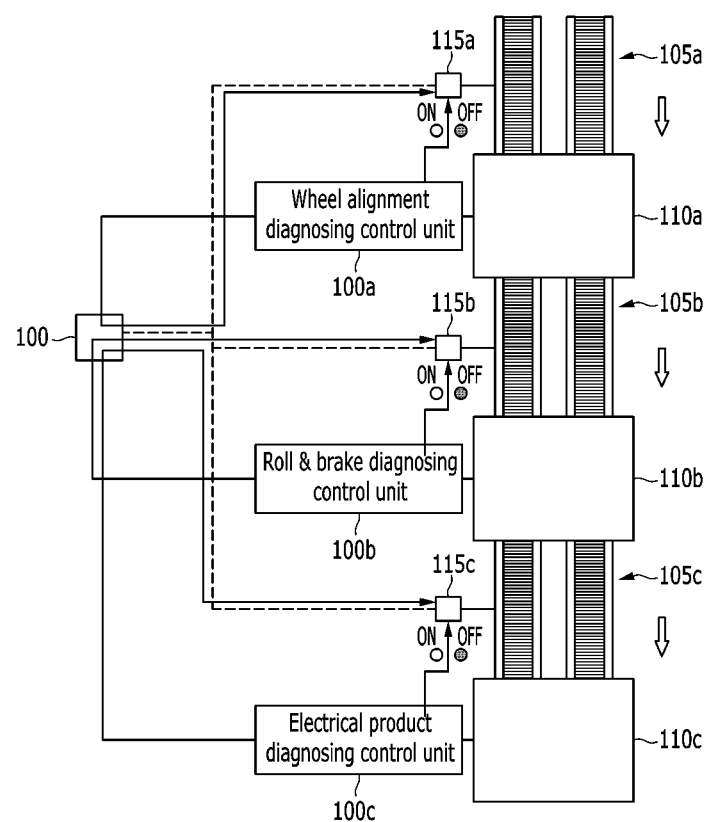
FIG. 1 is a block diagram schematically illustrating a transfer system for diagnosing a vehicle according to an exemplary embodiment of the present invention.

100: integrated control portion
100a: wheel alignment diagnosing controller
100b: roll & brake diagnosing controller
100c: electrical product diagnosing controller
105a: first conveyor
105b: second conveyor
105c: third conveyor
110a: wheel alignment diagnosing region
110b: roll & brake diagnosing region
110c: electrical product diagnosing region
115a: first conveyor controller
115b: second conveyor controller
115c: third conveyor controller
200: vehicle
300: guide rail
350: transfer unit
330: moving body
305: moving body driving unit
310: swing arm driving unit
320: free roller
315: swing arm
400: roll
600: sensor 2
610: sensor 3
700: sensor 6
705: sensor 7

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will described in detail with reference to the accompanying drawings. However, the size and thickness of each configuration shown in the drawings are optionally illustrated for better understanding and ease of description, the present invention is not limited to shown drawings. In the drawings, the thickness of layers, films, panels, regions, etc., are exaggerated for clarity.

Accordingly, the drawings and description are to be regarded as illustrative in nature and not restrictive. Like reference numerals designate like elements throughout the specification. It will be understood that, although the terms first and second etc. may be used herein to describe various elements, these elements should not be limited by these terms. These terms are used to distinguish one element from another.

FIG. 1 is a block diagram schematically illustrating a transfer system for diagnosing a vehicle according to an exemplary embodiment of the present invention. Referring to FIG. 1, a conveyor and transfer system may include a first conveyor 105a, a second conveyor 105b, a third conveyor 105c, a wheel alignment diagnosing region 110a, a roll & brake diagnosing region 110b, an electrical product diagnosing region 110c, a first conveyor controller 115a, a second conveyor controller 115b, a third conveyor controller 115c, a wheel alignment diagnosing controller 100a, roll & brake diagnosing controller 100b, an electrical product diagnosing controller 100c, and an integrated controller 100 as constituent elements. The integrated controller 100 may be configured to operate the other components/controllers of the system.

A completed vehicle may be moved onto the first conveyor 105a, the first conveyor 105a may be operated and moved, and the vehicle may enter into the wheel alignment diagnosing region 110a. Further, when an operation of the first conveyor 105a stops, a transfer unit 350 of FIG. 2 may be configured to clamp a front wheel tire of the vehicle to pull and position the front wheel tire to a preset position of the wheel alignment diagnosing region 110a. The wheel alignment diagnosing controller 100a may be configured to automatically (or manually) operate the vehicle to analyze alignment states of wheels and tires attached to the vehicle.

Figure 2:
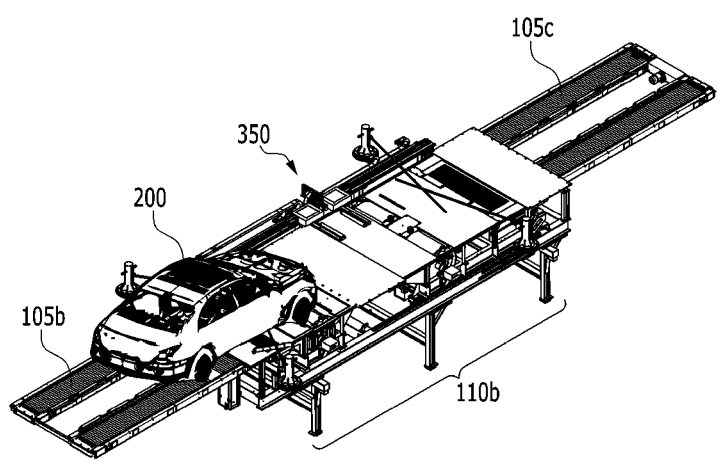
FIG. 2 is a partial perspective view illustrating a transfer system for diagnosing a vehicle according to an exemplary embodiment of the present invention.

When the diagnosing the wheel alignment is terminated, a transfer unit 350 of FIG. 2 may be configured to move the vehicle forward while clamping front and rear lower portions of a rear wheel tire of the vehicle disposed in the wheel alignment diagnosing region 110a, and the transfer unit 350 may be separated from a tire of the vehicle to move the vehicle onto the second conveyor 105b. Furthermore, the second conveyor 105b may be operated to introduce the vehicle into the roll & brake diagnosing region 110b.

As described above, when operation of the second conveyor 105b stops, a transfer unit 350 of FIG. 2 may be configured to clamp a front wheel tire of the vehicle to pull and position the front wheel tire to a preset position of the roll & brake diagnosing region 110b. The roll & brake diagnosing controller 100b may be configured to automatically (or manually) operate the vehicle to analyze a rotation characteristic and a brake function of tires attached to the vehicle.

When the diagnosing the roll & brake is terminated, a transfer unit 350 of FIG. 2 disposed in the roll & brake diagnosing region 110b may be configured to move the vehicle forward while supporting front and rear lower portions of the rear wheel tire of the vehicle, and the transfer unit 350 may be separated from the tire of the vehicle to move the vehicle onto the third conveyor 105c. In addition, the third conveyor 105c may be operated to introduce the vehicle into the electrical product diagnosing region 110c. The transfer unit 350 may be operated in the electrical product diagnosing region 110c to automatically position the vehicle in a preset location, and may be configured to perform an electrical product diagnosis.

The integrated control portion 100, the first conveyor control portion 115a, the second conveyor control portion 115b, the third conveyor control portion 115c, the wheel alignment diagnosing controller 100a, the roll & brake diagnosing controller 100b, and the electrical product diagnosing controller 100c may be referred to as one controller. The controller may be implemented by at least one microprocessor operating by a predetermined program, and the predetermined program may include a series of commands to perform a method according to an exemplary embodiment of the present invention.

In an exemplary embodiment of the present invention, a method and a structure of diagnosing a wheel alignment of the vehicle, a method and a structure of diagnosing a function of a roll & brake, and a method and a structure of diagnosing an electrical product refer to a known art, a detailed description thereof is omitted. The description is mainly focused on a structure and functions of the transfer unit 350 being main contents of the present invention. FIG. 2 is a partial perspective view illustrating a transfer system for diagnosing a vehicle according to an exemplary embodiment of the present invention. Referring to FIG. 2, the transfer system may include a vehicle, a second conveyor, a roll & brake diagnosing region, and a third conveyor as constituent elements.

When the vehicle is moved by the second conveyor 105b, and a front side of the vehicle 200 is introduced into the roll & brake diagnosing region 110b, the second conveyor 105b stops, and the transfer unit 350 may be operated to pull a front wheel tire of the vehicle 200 to a preset position of the roll & brake diagnosing region 110b. In particular, since the vehicle 200 may be placed in a neutral position (e.g., a neutral gear stage), the vehicle 200 may be moved to pull or push the front tire of the vehicle 200. A plurality of sensors configured to detect a position of the vehicle may be disposed at preset positions in the roll & roll brake diagnosing region 110b, respectively. A roll 400 of FIG. 4 for diagnosing the rotation characteristic and output of the tire and a brake function may be disposed at a preset position in the roll & roll brake diagnosing region 110b.

Figure 3:
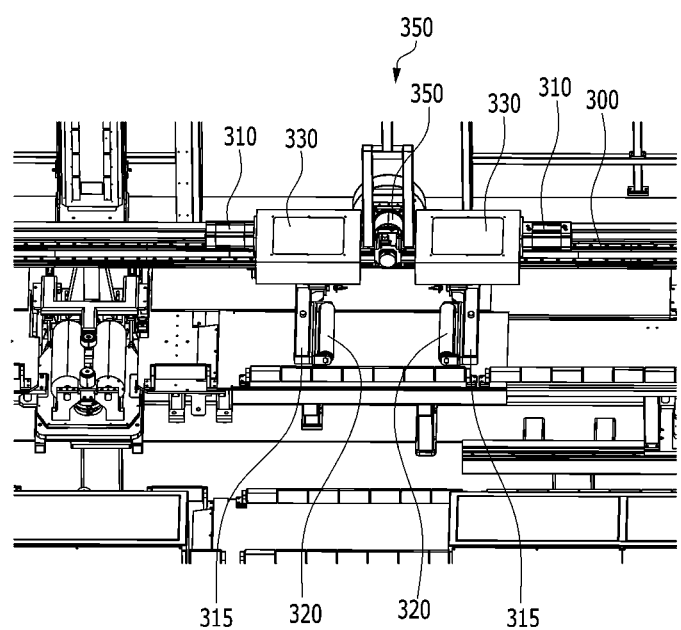
FIG. 3 is a detailed perspective view illustrating a part of a wheel alignment diagnosing region in a transfer system for diagnosing a vehicle according to an exemplary embodiment of the present invention.

FIG. 3 is a detailed perspective view illustrating a part of a wheel alignment diagnosing region in a transfer system for diagnosing a vehicle according to an exemplary embodiment of the present invention. Referring to FIG. 3, the transfer unit 350 disposed in the wheel alignment diagnosing region 110a may include guide rails 300, moving bodies 330, a moving body driving unit 305, a swing arm 315, a swing arm driving unit 310, and a free roller 320.

The guide rails 300 may be disposed at both sides of the vehicle 200 forward and rearward, respectively. The moving bodies 330 may be disposed on the guide rail 300 in both sides, respectively. Additionally, the moving bodies 330 may be moved forward and rearward by the moving body driving unit 305. The ends of the swing arms may be rotatably disposed in lower portions of the moving bodies 330 which are disposed in both sides, respectively. A free roll 320 may be fixed and disposed at a later side of the swing arm 315 to be rotated freely. The swing arm 315 may be unfolded into a direction in which the guide rail 300 is disposed by the swing arm driving unit 310, or may be concentrated inward vertically to the guide rail 300.

When the vehicle 200 is introduced by an input side conveyor when the swing arm 315 is unfolded outward and the front wheels and tires reach a preset position, the swing arm 315 may be concentrated inward so that the free roller 320 supports the front wheel tire. In particular, the moving body driving unit 305 may be configured to operate the moving bodies 330 and the swing arm 315 to move the wheels and the tires to a preset position, and the swing arm 315 may be unfolded, and diagnosing the wheel alignment may be performed. Further, the diagnosing the wheel alignment may be terminated, the unfolded swing arm 315 may be moved to a rear wheel tire side, and may again be concentrated to lift the rear wheel tire, to move the vehicle 200 to an output side conveyor, and the swing arm 315 may be unfolded in a preset position, and an output side conveyor may be operated to move the vehicle to the outside (e.g., outside the diagnosis system).

Figure 4:
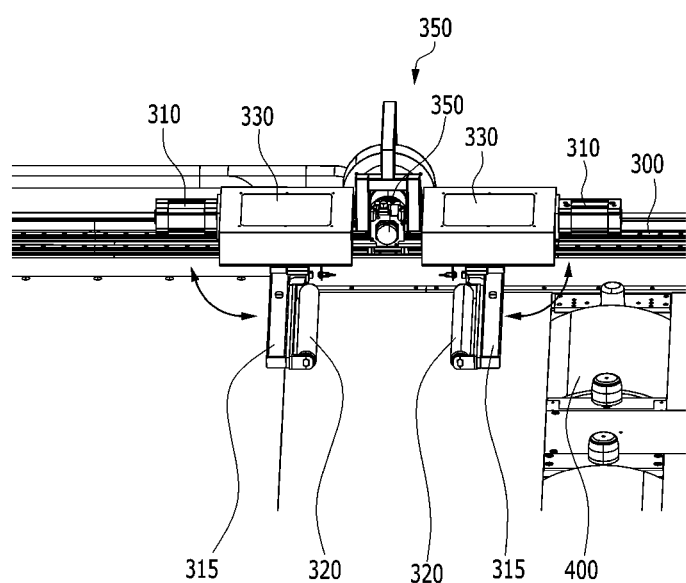
FIG. 4 is a detailed perspective view illustrating a part of a roll & brake diagnosing region in a transfer system for diagnosing a vehicle according to an exemplary embodiment of the present invention.

FIG. 4 is a detailed perspective view illustrating a part of a roll & brake diagnosing region in a transfer system for diagnosing a vehicle according to an exemplary embodiment of the present invention. Referring to FIG. 4, as shown in FIG. 3, the guide rails 300 may be disposed in both sides of the vehicle 200 forward and rearward, respectively. The moving bodies 330 may be disposed on the guide rail 300 in both sides, respectively. The moving bodies 330 may be moved forward and rearward by the moving body driving unit 305.

When the vehicle 200 is introduced by an input side conveyor, the swing arm 315 is unfolded outward and the front wheels and tires reach a preset position, the swing arm 315 may be concentrated inward (e.g., maintained in a folded position) so that the free roller 320 supports the tire upward. In particular, the moving body driving unit 305 may be configured to operate the moving bodies 330 and the swing arm 315 to move the wheels and the tires to a preset position in which the roll 400 is disposed, and the swing arm 315 may be unfolded, and diagnosing the roll & brake may be performed. Further, the diagnosing the roll & brake may be terminated, the unfolded swing arm 315 may be moved to a rear wheel tire, and again may be concentrated to lift the rear wheel tire, to move the vehicle 200 to an output side conveyor, the swing arm 315 may be unfolded in a preset position, and an output side conveyor may be operated to move the vehicle to the outside.

Figure 5:
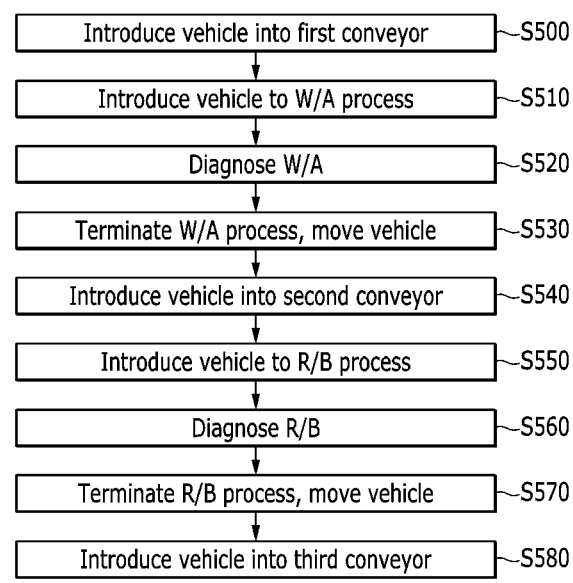
FIG. 5 is a flowchart illustrating a method for transferring a vehicle according to an exemplary embodiment of the present invention.

FIG. 5 is a flowchart illustrating a method for transferring a vehicle according to an exemplary embodiment of the present invention. Referring to FIG. 5, in the vehicle transfer method, in step S500, a vehicle 200 may be introduced into a first conveyor 105a. In step S510, an operation of the first conveyor 105a may be stopped, and the vehicle 200 may be introduced into a wheel alignment diagnosing region 110a by the transfer unit 350. In step S520, diagnosis of a wheel alignment of the vehicle 200 may start.

In step S530, the diagnosing of the wheel alignment of the vehicle 200 may be terminated, the vehicle 200 may be moved by the transfer unit 350. After that, in step S540, the vehicle 200 may be introduced onto the second conveyor 105b by the transfer unit 350. In step S550, when a front side of the vehicle 200 is introduced into the roll & brake diagnosing region 110b, an operation of the second conveyor 105b may be stopped, and the vehicle 200 may be moved to a preset position of the roll & brake diagnosing region by the transfer unit 350. In step S560, when the diagnosing the roll & brake of the vehicle 200 starts, and in step S570, and the diagnosing the roll & brake of the vehicle 200 may be terminated, the transfer unit 350 may be configured to move the vehicle 200. In step S580, when the vehicle 200 is introduced into the third conveyor 105c, the transfer unit 350 may be separated from the vehicle.

Figure 6:
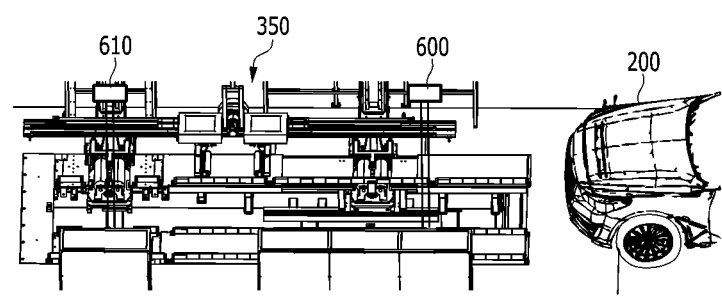
FIG. 6 is an overall perspective view illustrating a wheel alignment diagnosing region in a transfer system for diagnosing a vehicle according to an exemplary embodiment of the present invention.

FIG. 6 is an overall perspective view illustrating a wheel alignment diagnosing region in a transfer system for diagnosing a vehicle according to an exemplary embodiment of the present invention. Referring to FIG. 6, when a sensor configured to detect a position of the vehicle 200 is installed at a preset position, and the vehicle is introduced into an input side of a wheel alignment diagnosing region 110a, the sensor 2 600 may be configured to detect the vehicle 200, and the controller may be configured to stop an operation of the first conveyor 105a. The transfer unit 350 may be configured to clamp a tire of a front wheel of the vehicle, and move the vehicle to a preset reference position by a sensor 3 610, and wheel alignment diagnosis may be performed. Furthermore, the wheel alignment diagnosis may be terminated, the transfer unit 350 may be configured to move to a rear wheel side, and clamp a rear wheel tire to move and exhaust the vehicle 200 forward.

Figure 7:
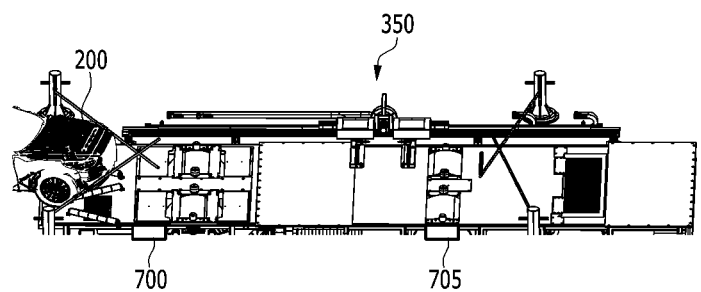
FIG. 7 is an overall perspective view illustrating a roll & brake diagnosing region in a transfer system for diagnosing a vehicle according to an exemplary embodiment of the present invention.

FIG. 7 is an overall perspective view illustrating a roll & brake diagnosing region in a transfer system for diagnosing a vehicle according to an exemplary embodiment of the present invention. Referring to FIG. 7, when a sensor configured to detect a position of a vehicle is installed at a preset position, and the vehicle may be introduced to an input side of the roll & brake diagnosing region 110b, the sensor 6 700 may be configured to detect the vehicle, and a controller may be configured to stop an operation of the second conveyor 105b. The transfer unit 350 may be configured to clamp a tire of a front wheel of the vehicle, and move the vehicle to a preset reference position by a sensor 7 705, and diagnosing the roll & brake may be performed. Furthermore, the diagnosing of the roll & brake may be terminated, the transfer unit 350 may be configured to move to a rear wheel side, and clamp a rear wheel tire to move and exhaust the vehicle 200 forward.

Figure 8:
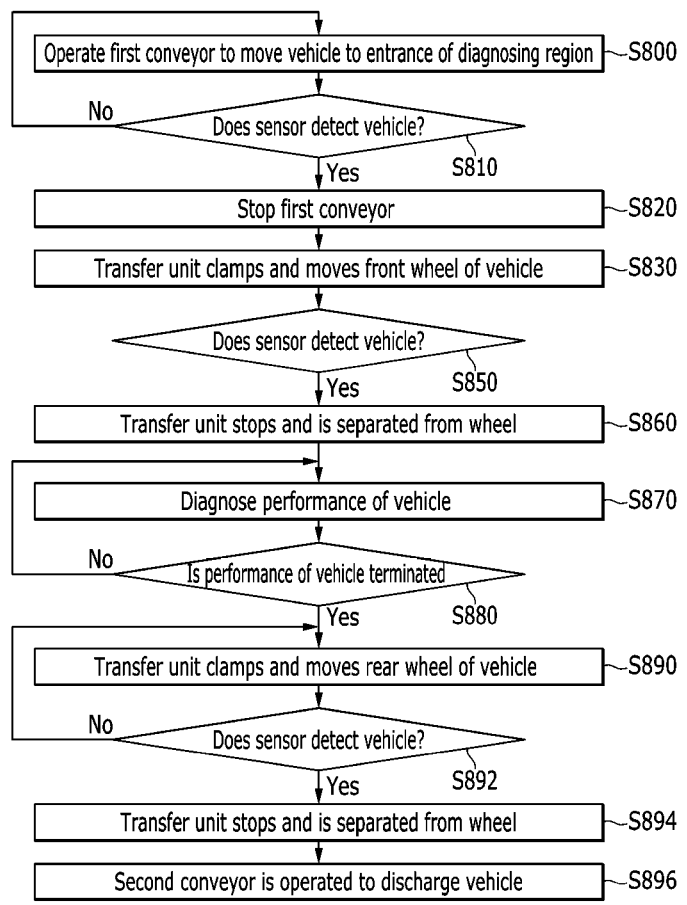
FIG. 8 is a flowchart illustrating a transfer method for diagnosing a vehicle according to an exemplary embodiment of the present invention.

FIG. 8 is a flowchart illustrating a transfer method for diagnosing a vehicle according to an exemplary embodiment of the present invention. Referring to FIG. 8, in step S800, a first conveyor may be operated to move the vehicle to an entrance of a diagnosing region. In step S810, an introducing sensor (reference numeral is not shown) disposed at the input side of the diagnosing region may be configured to detect the vehicle.

When the introducing sensor detects the vehicle in step S810, the first conveyor may be stopped in step S820 and the transfer unit may be configured to clamp and move a front wheel of the vehicle in step S830. In step S850, when a position sensor (reference numeral is not shown) detects the vehicle, the transfer unit may be configured to stop and separate from a wheel in step S860. When the preset performance of the vehicle is diagnosed in step S870, the preset performance of the vehicle may be terminated in step S880, the transfer unit may be configured to clamp and move a rear wheel of the vehicle in step S890. In step S892, when a discharge sensor (reference numeral is not shown) detects the vehicle, the transfer unit may be configured to stop and separate from the rear wheel in step S894. Next, in step S896, the second conveyor may be operated to discharge the vehicle to the outside.

While this invention has been described in connection with what is presently considered to be exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. A transfer system for diagnosing a vehicle, comprising:
   a transfer unit disposed at an input side or an output side of a conveyor configured to move the vehicle into a diagnosing region to diagnose performance of the vehicle,
   wherein the transfer unit is engaged with a wheel of the vehicle when the vehicle is introduced to an input side of the diagnosing region, is configured to move the vehicle to a preset position of the diagnosing region, is separated from the wheel of the vehicle, and is again engaged with the wheel of the vehicle to move the vehicle to an output side after performance of the vehicle is diagnosed, and
   wherein the transfer unit includes:
      a moving body movably disposed along a guide rail disposed in a moving direction of the vehicle;
      swing arms rotatably connected with a forward side and a rear side of the moving body, respectively, and concentrated inward to be disposed forward and rearward of a lower portion of a front wheel tire or a rear wheel tire of the vehicle;
      free rollers rotatably disposed at each side of each swing arm concentrated inward to rotatably clamp the tire, respectively;
      a swing arm driving unit configured to provide a driving force to concentrate the swing arms inward or unfold the swing arms outward; and
      a moving body moving unit configured to move the moving body along the guide rail forward and rearward, and
   wherein when the vehicle is introduced into the diagnosing region, the transfer unit is configured to clamp and move a forward tire of the vehicle forward, and when the vehicle is discharged from the diagnosing region, the transfer unit is configured to clamp the rear wheel of the vehicle to move the vehicle to an outside.

2. The transfer system of claim 1, further comprising:
   a plurality of sensors disposed at a preset position to detect the vehicle which is introduced into the diagnosing region or is discharged from the diagnosing region, respectively; and
   a controller configured to operate the swing arm driving unit and the moving body moving unit of the transfer unit based on the position of the vehicle detected by the sensors.

3. The transfer system of claim 2, wherein the diagnosing region includes:
   a wheel alignment diagnosing region configured to diagnose alignment of the tire and the wheel of the vehicle; and
   a roll & brake diagnosing region disposed rearward of the wheel alignment diagnosing region to diagnose rotation and brake of the tire and the wheel.

4. The transfer system of claim 3, wherein the conveyor includes:
   a first conveyor disposed at an input side of the wheel alignment diagnosing region;
   second conveyors disposed at an output side of the wheel alignment diagnosing region and an input side of the roll & brake diagnosing region; and
   a third conveyor disposed at an output side of the roll & brake diagnosing region.

5. The transfer system of claim 4, wherein the controller is configured to operate each of the conveyors.

6. The transfer system of claim 5, wherein in response to determining that the vehicle is introduced into the diagnosing region by the sensor, the controller is configured to stop an operation of the conveyor disposed at the diagnosing region, move the moving body to a position that corresponds to the wheel of the vehicle when the swing arms are unfolded, and concentrate the swing arms so that the free rollers clamp the tire, and the moving body driving unit is configured to move the tire to a diagnosing position.

7. The transfer system of claim 6, wherein in response to determining that a performance of the vehicle is diagnosed, the controller is configured to operate the moving body driving unit to move the tire to a preset position in an output direction, the swing arm driving unit is configured to unfold the swing arm to separate the swing arms from the tire, and the controller is configured to operate the conveyor disposed at an output side of the diagnosing region to discharge the vehicle from the diagnosing region.

8. A transfer method of diagnosing a vehicle, comprising:
   determining, by the controller, whether the vehicle is introduced into an input side of a diagnosing region;
   when the vehicle is introduced, moving, by the controller, the vehicle to a diagnosing position by clamping a forward wheel tire of the vehicle using a transfer unit; and
   diagnosing, by the controller, a performance of the vehicle, when the diagnosing is terminated, moving the vehicle to an output side of the diagnosing region by clamping the rear wheel tire of the vehicle by the transfer unit,
   wherein the transfer unit includes:
      a guide rail disposed in a moving direction of the vehicle in both sides of the diagnosing region;
      a moving body movably disposed along the guide rail;

swing arms rotatably connected with a forward side and a rear side of the moving body, respectively, and concentrated inward to be disposed forward and rearward of a lower portion of a front wheel tire or a rear wheel tire of the vehicle;

free rollers rotatably disposed at each side of each swing arm concentrated inward to rotatably clamp the tire, respectively;

a swing arm driving unit configured to provide a driving force to concentrate the swing arms inward or unfold the swing arms outward; and a moving body moving unit configured to move the moving body along the guide rail forward and rearward, and wherein when the vehicle is introduced into the diagnosing region, the transfer unit is configured to clamp and move a forward tire of the vehicle forward, and when the vehicle is discharged from the diagnosing region, the transfer unit is configured to clamp the rear wheel of the vehicle to move the vehicle to an outside.

9. The transfer method of claim 8, further comprising: detecting, by the controller, a position of the vehicle using a sensor.

10. The transfer method of claim 8, wherein the diagnosing region includes:
   a wheel alignment diagnosing region configured to diagnose alignment of the tire and the wheel of the vehicle; and
   a roll & brake diagnosing region disposed rearward of the wheel alignment diagnosing region to diagnose rotation and brake of the tire and the wheel.

11. The transfer method of claim 8, wherein in response to determining that the vehicle is introduced into the diagnosing region, the controller is configured to stop an operation of the conveyor disposed at the diagnosing region, move the moving body to a position that corresponds to the wheel of the vehicle in a state when the swing arms are unfolded, and concentrate the swing arms so that the free rollers clamp the tire, and the moving body driving unit is configured to move the tire to a diagnosing position.

12. The transfer method of claim 8, wherein in response to determining that a performance of the vehicle is diagnosed, the controller is configured to operate the moving body driving unit to move the tire to a preset position in an output direction, the swing arm driving unit is configured to unfold the swing arm to separate the swing arms from the tire, and the controller is configured to operate the conveyor disposed at an output side of the diagnosing region to discharge the vehicle from the diagnosing region.

13. A transfer unit, comprising:
   a moving body movably disposed along a guide rail disposed in a moving direction of a vehicle;
   swing arms rotatably connected with a forward side and a rear side of the moving body, respectively, and concentrated inward to be disposed forward and rearward of a lower portion of a front wheel tire or a rear wheel tire of the vehicle;
   free rollers rotatably disposed at each side of each swing arm concentrated inward to rotatably clamp the tire, respectively;
   a swing arm driving unit configured to provide a driving force to concentrate the swing arms inward or unfold the swing arms outward; and
   a moving body moving unit configured to move the moving body along the guide rail forward and rearward,
   wherein when the vehicle is introduced into a diagnosing region, the transfer unit is configured to clamp and move a forward tire of the vehicle forward, and when the vehicle is discharged from the diagnosing region, the transfer unit is configured to clamp the rear wheel of the vehicle to move the vehicle to an outside.

\* \* \* \* \*